# 2,957,002
Patented Oct. 18, 1960

2,957,002

6-LOWER ALKYL CARBOXAMIDOBENZO-THIAZOLE-2-SULFONAMIDE

Jerome Korman, Portage Township, Kalamazoo County, Mich., assignor to The Upjohn Company, Kalamazoo, Mich., a corporation of Michigan No Drawing. Filed Apr. 30, 1958, Ser. No. 731,885

2 Claims. (Cl. 260—306.6)

This invention relates to new compounds, 6-lower-carboxamidobenzothiazole-2-sulfonamides, and to novel intermediates in the preparation thereof.

The novel compounds of the invention have the structural formula:

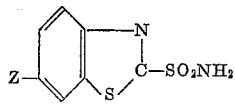

wherein Z is a lower-carboxamido group.

In the preparation of the novel compounds of the invention, a lower-carboxamidobenzothiazole-2-thiol is first converted to the corresponding sulfenamide by oxidative condensation with an amide-forming nitrogen compound which can be carried out in one step [see Carr, Smith, and Alliger, J. Org. Chem. 14: 921–34 (1949); Tschunkur and Kohler, U.S. Patent 2,045,888; Ashworth, U.S. Patent 2,268,467; Carr, U.S. Patent 2,271,834; and Harman, U.S. Patents 2,191,656–7], or in two steps via an N-chloroamine [see Hanslick, U.S. Patent 2,261,024; British Patent 377,730; and Alliger, U.S. Patents 2,495,085 and 2,581,921], or in two steps via the disulfide [see Busch, Ber. 29: 2127 (1896); Tchunkur and Kohler, U.S. Patent 2,045,888]. The obtained sulfenamide is then treated with a strong oxidizing agent to convert it to the desired sulfonamide. The oxidizing agent, advantageously aqueous potassium permanganate, is added gradually with stirring and with cooling, if desired, advantageously to a solution of the sulfenamide in an inert solvent such as acetone, pyridine, dioxane, and like polar solvents such as commonly are used as media for permanganate oxidations. Other strong oxidizing agents of an alkaline character, that is, which are either effective in an alkaline solution or produce in the oxidation an alkaline component, can be used. Alkaline hydrogen peroxide and sodium peroxide, for example, could be used in place of potassium permanganate. Acidic oxidations using hydrogen peroxide in acetic acid, chromic acid, nitric acid, permanganic acid, and the like, can be used. The oxidizing agent advantageously can be dissolved in a solvent (water, for example, is suitable for potassium permanganate) and the solution slowly added to the sulfenamide solution. If the rate of addition is properly adjusted, excessive heating will be avoided. Ordinarily it will be sufficient if the rate of addition of the oxidizing agent is so correlated with the capacity of the apparatus to dissipate heat as to keep the temperature below the decomposition temperature for either the sulfenamide used or the sulfonamide produced in the reactor mixture, whichever is the lower. As this temperature will vary according to the decomposition temperature of the compounds involved, no hard and fast rule can be given, but, in general, it will be sufficient if the temperature is kept below about sixty degrees centigrade. Any lower reactive temperature can be used. At lower temperatures, however, the rate of reaction is reduced so that it is ordinarily desirable not to operate at temperatures below about minus five degrees centigrade. Ordinarily a temperature between about zero and about fifty degrees centigrade is suitable. When the reaction is complete, the desired sulfonamide, after acidification to free it from its salt, if such is formed, can then be recovered in any suitable manner, as by filtration, centrifugation, solvent extraction, or the like, and can, if desired, be purified by recrystallization from a solvent.

When ammonia is used the unsubstituted amide is obtained. By substituting methylamine for ammonia, the corresponding N-methyl sulfonamide is obtained. In the like manner, by substituting secondary amines and other primary amines in the above reactions, there are also obtained the corresponding N,N-dimethyl, N,n-butyl, N-isobutyl, N-sec-butyl, N-tert-butyl, N,N-diisopropyl, N-methyl - N-ethyl, N-2-aminoethyl, N-(2-ethylhexyl), N-cyclohexyl, N - methyl-N-cyclohexyl, N-2-methylcyclohexyl, N-cyclopentyl, and like N-mono- and N-di-lower-alkyl and cycloalkyl sulfonamides; N-2-pyridyl, N-2-thiazolyl, N-2-pyrimidyl, and like N-heterocyclic sulfonamides; and N-phenyl, N-methyl-N-phenyl, N-2-thienyl, N-thenyl, N-2-furyl, N-furfuryl, N-tolyl, N-benzyl, N-phenethyl, and like N-aryl and N-aralkyl sulfonamides. Also by substituting the ammonia by a heterocyclic secondary amine such as piperidine, pyrrolidine, piperazine, N-methylpiperazine, morpholine, and the like, as well as the lower-alkyl derivatives thereof, such as 2-methylpiperidine, 2,2-dimethylpyrrolidine, and the like, there are obtained the corresponding sulfonamides in which the amide nitrogen is comprised in a heterocycle. Thus the —NH₂ group in the above formulas can be replaced by the group —NR'R" in which R' and R", representatively, are hydrogen, lower-alkyl, lower-cycloalkyl, lower-aryl, or lower-aralkyl, and together a lower-alkylene lower-oxalkylene, or lower-azalkylene radical forming with the nitrogen a five to six membered heterocyclic ring.

The invention may be more fully understood by reference to the following examples which are illustrative only and not intended to be limiting.

EXAMPLE 1

(A) *6-acetamidobenzothiazole-2-sulfenamide*

A solution prepared by dissolving 22.4 grams (0.1 mole) of 6-acetamidobenzothiazole-2-thiol (Herz, Schubert, and Zerweck, U.S. Patent 1,847,514) in 75 milliliters of water containing five grams of sodium hydroxide, and 75 milliliters of ten percent sodium hypochlorite solution were added simultaneously to 300 milliliters of concentrated ammonium hydroxide which was vigorously stirred and cooled to zero degrees centigrade. During the addition the temperature was not allowed to rise above five degrees centigrade. The resulting solid was recovered by filtration, thoroughly washed with water, and dried at room temperature. There was obtained 21.0 grams of crude 6 - acetamidobenzothiazole - 2 - sulfenamide. A sample which was recrystallized from ethylene dichloride melted at 239–241 degrees centigrade.

*Analysis.*—Calculated: C, 45.17; H, 3.79; N, 17.56; S, 26.79. Found: C, 45.47, 45.43; H, 3.76, 3.75; N, 17.24, 17.70; S, 26.80.

The sulfenamide thus produced is useful as an accelerator in the vulcanization of rubber or as an intermediate for the preparation of the corresponding sulfonamide in accordance with the following:

(B) *6-acetamidobenzothiazole-2-sulfonamide*

To a stirred solution of sixteen grams of potassium permanganate in 500 milliliters of water was added dropwise a solution of sixteen grams of 6-acetamidobenzothiazole-2-sulfenamide in 500 milliliters of acetone. The temperature rose to 43 degrees centigrade. The reaction mixture was filtered, the solid (manganese dioxide) was washed with 100 milliliters of warm water, and the combined filtrates were concentrated under reduced pressure to remove acetone. The residual solution was treated with charcoal, filtered, and acidified with concentrated hydrochloric acid. The solid sulfonamide was recovered by filtration, washed with water, and dried, to give 6.2 grams of 6-acetamidobenzothiazole-2-sulfonamide, melting at 225–233 degrees centigrade. A sample recrystallized from hot water melted at 233–235 degrees centigrade.

*Analysis.*—Calculated: C, 39.84; H, 3.34; N, 15.49; S, 23.63. Found: C, 40.34, 40.33; H, 3.21, 3.19; N, 15.58; S, 23.51.

In place of 6-acetamidobenzothiazole-2-thiol there can be substituted other lower-carboxamido analogues thereof such as 4- and 6-propionamido-, 4- and 6-valeramido-, 4- and 6-caprylamido-, 4- and 6-benzamido-, and 4-carboxy-6-benzamidobenzothiazole-2-thiols, and like lower carboxamidobenzothiazole-2-thiols such as may be prepared by the process of Herz, Schubert, and Zerweck, U.S. Patent 1,847,514. By so substituting the 6-acetamidobenzothiazole-2-thiol, there are obtained 4- and 6-propionamido-, 4- and 6-valeramido-, 4- and 6-caprylamido-, 4- and 6-benzamido-, and 4-carboxy-6-benzamidobenzothiazole-2-sulfenamides and sulfonamides. The sulfonamides thus produced are useful as diuretics.

This application is a continuation-in-part of copending applications Serial No. 462,113, filed October 13, 1954, now Patent No. 2,868,800, and Serial No. 723,136, filed March 24, 1958, now abandoned.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:
1. 6-acetamidobenzothiazole-2-sulfonamide.
2. The compound having the formula:

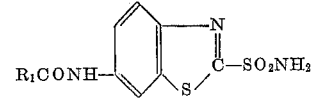

wherein $R_1$ represents lower-alkyl.

References Cited in the file of this patent
UNITED STATES PATENTS
2,050,199    Sebrell _____ Aug. 4, 1936

OTHER REFERENCES

Kaufmann et al.: Chem. Abstracts, vol. 38, col. 2324 (1944).